United States Patent [19]

Ptaszek

[11] 4,272,095
[45] Jun. 9, 1981

[54] CHILD'S WHEELED RIDING TOY

[76] Inventor: George W. Ptaszek, Elm St., P.O. Box 260, Pascoag, R.I. 02859

[21] Appl. No.: 895,663

[22] Filed: Apr. 12, 1978

[51] Int. Cl.³ .............................................. B60B 33/04
[52] U.S. Cl. .................................. 280/220; 280/282; 280/661
[58] Field of Search ............... 280/282, 263, 266, 267, 280/270, 274, 771, 1.182, 220, 661; 16/18 A, 19

[56] References Cited

U.S. PATENT DOCUMENTS

| | | | |
|---|---|---|---|
| 591,636 | 10/1897 | Richter | 280/266 |
| 3,062,559 | 11/1962 | Hewitt | 280/282 X |
| 3,206,223 | 9/1965 | Frye | 280/282 X |
| 3,311,388 | 3/1967 | Ryan | 280/282 X |
| 3,427,037 | 2/1969 | Marasco | 280/1.204 |
| 3,645,558 | 2/1972 | McMullen | 280/270 |

Primary Examiner—John J. Love
Assistant Examiner—Michael Mar
Attorney, Agent, or Firm—Barlow & Barlow

[57] ABSTRACT

A riding toy primarily for a child is disclosed of the type having three wheels and commonly called a tricycle. The particular toy embodies a large front wheel with a pair of smaller castered rear wheels, the castered rear wheels having a swivel axis which may be rocked from a first to a second position; thus for normal action of the toy the swivel axis will be substantially at right angles to the rotational axis of the castered wheels. The operator can control the rocking of the rear wheels and thus change the swivel axis away from a right angle position so that the toy may spin about the surface engagement point of the front wheel.

7 Claims, 5 Drawing Figures

U.S. Patent  Jun. 9, 1981  4,272,095
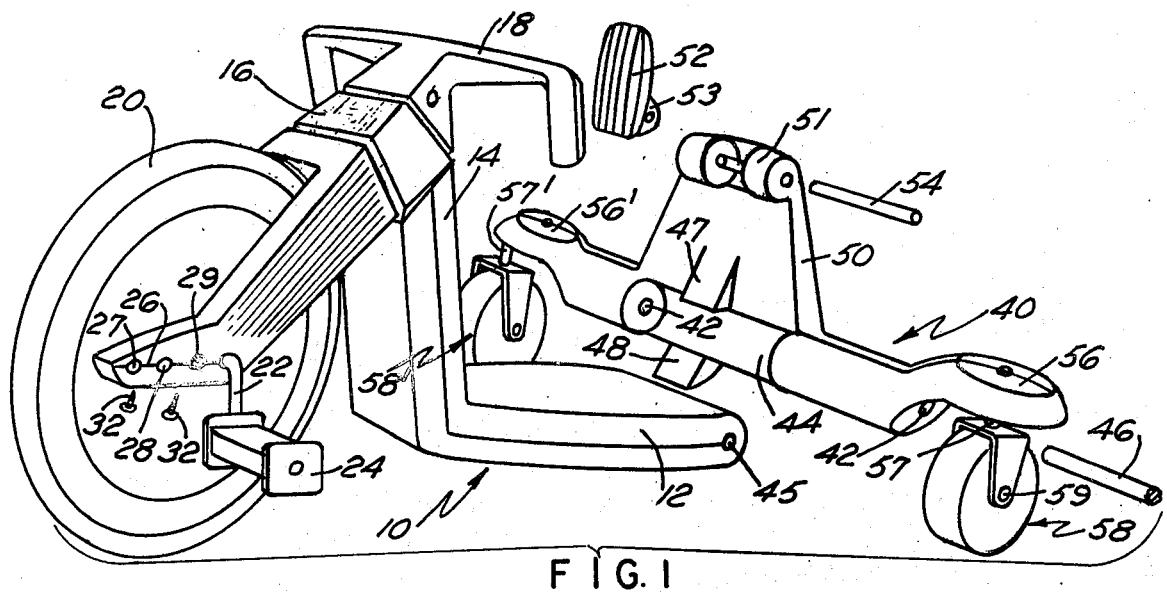
FIG. 1
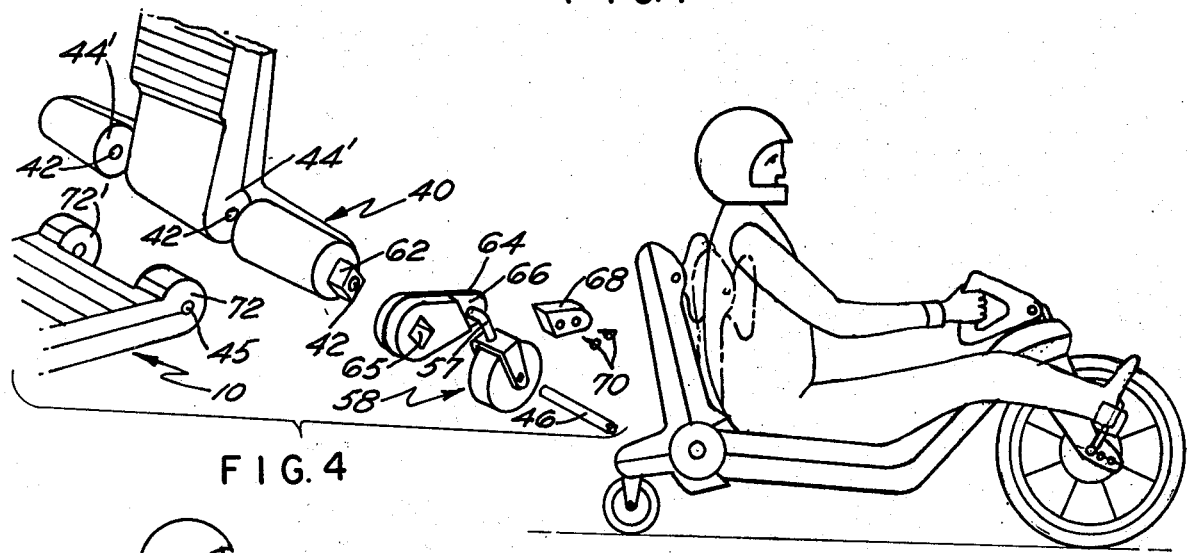
FIG. 4
FIG. 2
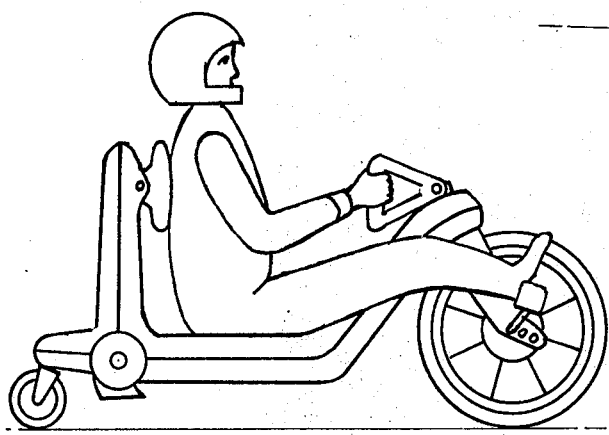
FIG. 3
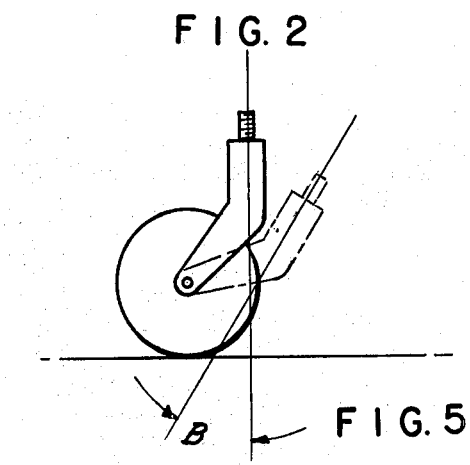
FIG. 5

CHILD'S WHEELED RIDING TOY

BACKGROUND OF THE INVENTION

This invention relates to a child's riding toy commonly known as a tricycle which includes a frame with means to support a child and generally a large front wheel and a pair of spaced rear wheels. The toy is propelled by pedals mounted as opposed cranks on the axle of the front wheel. More recently, the configuration of the toys have changed so that now the framework is arranged relatively low to the ground but maintains the normal large front wheel with the pedals and a pair of spaced rear wheels, all supported by the frame.

SUMMARY OF THE INVENTION

The present invention provides a child's wheeled riding toy with a frame structure that will provide a seating support for the child. The frame provides means to support a front wheel at one end thereof, a pair of spaced castered rear wheels at the other end. A front wheel is provided with pedals mounted on crank arms which are coupled directly to the rotational axis of the front wheel, and the castered rear wheels are supported on the frame in such a way that they may have their swivel axes rocked. In the preferred form the rocking action of the swivel axis of the rear wheels is provided by a back rest which is coupled to the support for the rear wheels so that as pressure is placed on the back rest, the swivel axis of the rear wheels may be altered. The arrangement is such that when the swivel axis of the rear wheels is at an angle to the ground or riding surface of the rear wheels, the riding toy may be propelled in a normal fashion for forward or rearward movement, but when the swivel axis of the rear wheels is changed to be substantially at right angles or vertical to the ground or riding surface by rocking the back rest, the rear wheels will now completely caster and be allowed to spin so that the rear portion of the toy will effectively spin about the surface engagement point of the front wheel and thereby create a novel effect. Therefore, the main object of the present invention is to provide a three-wheel vehicle in which the rear wheels are arranged in such a way that the vehicle may be caused to whip, i.e., spin about similar to the manner in which an automobile spins out on a racing track.

A further object of the invention is to provide a three-wheeled vehicle as described above in which the operator may cause the vehicle to operate normally in a forward or rearward direction or be controlled to whip or spin.

DESCRIPTION OF THE DRAWINGS

FIG. 1 is an exploded perspective view of the riding toy of my invention;

FIG. 2 is an elevational view showing the riding toy in a position where the rear portion thereof may whip or spin;

FIG. 3 is an elevational view showing the toy in normal trailing position;

FIG. 4 is a partial exploded perspective view showing a modified arrangement for mounting the wheels; and FIG. 5 is a diagrammatic view illustrating the action of the castered rear wheels.

DESCRIPTION OF THE PREFERRED EMBODIMENT

Referring to FIG. 1 of the drawings, the child's riding toy is illustrated as including a frame 10 of general L-shape having a general horizontally directed portion 12 that serves as a seat and an upwardly directed portion 14. The upwardly directed portion 14 supports a fork 16 of conventional construction that has a shaft (not shown) that passes through the portion 14 and connects to handlebars 18. A front wheel 20 is of conventional construction and includes an axle that extends outwardly from both planar edges of the extent of the wheel that is then bent into a pair of oppositely disposed crank arms, such as crank arm 22, that in turn support pedals such as 24, there being only one pedal illustrated in the drawing. To provide adjustment for the size of the child using the toy, the fork 16 may have its lower terminal end split as at 26 and then provided with a plurality of apertures 27, 28, 29 and 30 through which the axle may extend that mounts the crank arms such as 22. As will be readily understood, the positioning of the front wheel may be altered by spreading apart the terminal end of the fork and moving the axle from one opening to the next and then refastening the split portion of the axle by simple screws or bolts such as illustrated at 32.

The rear wheels of the toy are supported on a rear cross member generally designated 40. This cross member is provided with a bore 42 and a recess 44 into which the rear end of the frame 10 may be fitted. The rear end of the frame 10 is also provided with a bore 45, and when fitted into the recess 44, the bores 42 and 45 may become aligned and receive a pinning rod 46 to effectively mount the cross member 40 to the frame in a fashion whereby they may relatively rock. The rocking action is limited by a pair of projections 47 and 48 which will engage the upper surface of the seat portion 12 or the lower surface of the seat portion 12, and as will be presently described in connection with FIGS. 2 and 3 will limit the movement of the cross member 40.

The cross member 40 is also provided with a vertically rising support portion 50 to which may be pivotally attached near the upper end thereof a back rest 52. Specifically, this is done by providing a pair of ears 51 on the portion 50, and an ear 53 on the back rest 52, each having apertures therein so that when aligned, a pin 54 will keep the members assembled and allow the back rest 52 to rock.

The extremities of the cross member 40 are formed with an integral flattened dish-like formation 56, 56' which receives the swivel axle 57, 57' of the casters generally designated 58, 58'. These casters are of usual construction having the swivel axle 57 with a fork that supports the wheel axle 59.

Reference should now be had to FIGS. 2 and 3 of the drawings to understand the operation of the riding toy. FIG. 2 illustrates the toy in what has been termed a "spinout" or whipping position. As can be noted, the swivel axle of the caster is substantially at right angles to the surface on which the toy rides and is also substantially normal or at right angles to the rotational axis of the caster. Casters, of course, can take different forms and by referring to FIG. 5, a knee-shaped or supported caster is illustrated, and additionally the relationship where the swivel axis is either normal to the surface or inclined thereto has been designated as an angle B. It is known, for example, that when casters have their swivel axis perpendicular to the surface, they will operate normally, that is to say, the caster will swivel about the swivel axis, but as the swivel axis comes away from this ideal position and approaches an angle substantially on the order of 30°, the caster will no longer swivel as such about its so-called swivel axis. As seen in FIG. 5, this is due to the fact that the swivel axis now intersects the point of ground engagement of the caster wheel. It will be appreciated that the design of the caster may change the actual angle B in any one given case, but in some of the standard caster constructions that have been used, it has been found that this angle equals 32°.

Referring now to FIG. 3 of the drawings, there is illustrated the position where the swivel axis of the caster is inclined at something on the order of 30° as just explained above, and in this position it is found that the rear castered wheels will effectively act as normal rear wheels on a tricycle-type of construction and will accordingly follow the direction that the operator chooses to go by virtue of his action in steering the toy. It will, therefore, be apparent from examining FIGS. 2 and 3 that the toy can be operated in a normal fashion as seen in FIG. 3, and it is merely necessary for the user to push with his back against the back rest 52 which will in turn rotate the cross member 40 and change the inclination of the swivel axis of the casters to substantially a position which will be perpendicular or nearly perpendicular to the ground, which position can also be related to the rotational axis of the caster wheel itself. The pivoting of the back rest 52 gives comfort to the user of the toy, and it will, of course, be appreciated that by initial design that the projections 46 and 48 act as stops and hence limit the amount of movement of the casters, and more particularly the angular relationship of the swivel axis thereof.

Referring to FIG. 4 of the drawings, a slight constructional variation of the cross member 40 has been illustrated. To this end there is shown a modified cross member 40' which at its outer ends is provided with a keying structure here shown as a square protrusion 62. An arm 64 provided with a mating square opening 65 that will tightly fit over the square protrusion 62 is provided, the arm being provided with a cutout as at 66 to receive the swivel axle 57' of the caster 58'. To hold the axle in the notch a plate 68 which may also be provided with a notch 69 may be fastened as by screws 70 to the arm 64 and retain the swivel axle of the caster in position. Additionally, in the modification of FIG. 4, the manner of coupling the rear of the frame 10 to the cross member 40' has been altered somewhat, and to this end the rear end of the frame 10' has been provided with a pair of ears 72, 72' which are provided with apertures 45' and these ears fit into a pair of cutout portions 44' on the cross member 40. Coupling of the units is done in the same fashion by passing a pin member 46' through a central bore 42' in the cross member 40, which will when aligned engage and pass through the bores 45' in the ears 72 and provide the necessary pivotal movement of the cross member relative to the frame.

It will, of course, be understood that various other modifications may suggest themselves to those skilled in the art.

I claim:

1. A three wheeled vehicle comprising a frame, a front wheel, first means supporting the front wheel for steering movement from said frame, a pair of castered rear wheels each having a swivel axis and a rotational axis, second means supporting said rear wheels from said frame, said second means permitting rocking of the swivel axis of said rear wheels from a tracking position wherein the swivel axis is at an acute angle with a vertical line normal to the ground to a nontracking position wherein said swivel axis is substantially normal to the ground whereby the vehicle may spin about the ground engagement point of the front wheel in said nontracking position.

2. A three wheeled vehicle as in claim 1 including means coupled to the rear wheel support for rocking the same between two positions and step means for limiting the rocking movement with respect to said frame.

3. A three wheeled vehicle as in claim 1 wherein the means supporting the rear wheels includes a back rest portion made integral therewith and stop means to limit the rocking movement whereby the operator may move the back rest in an infinite number of positions between the two stop means.

4. A three wheeled vehicle as in claim 3 wherein the back rest is provided with a pivotal pad for engagement with the back of the user.

5. A three wheeled vehicle as claimed in claim 2 wherein the angle of the swivel axis to the riding surface is between 58° and 90°.

6. A wheeled vehicle comprising, a frame having means for supporting a driver, a front wheel and at least a pair of spaced rear wheels, means for steering said front wheel and means formoving said rear wheels between a first or normal position wherein said rear wheels track the direction of said front wheel and a second position wherein said rear wheels will rotate about a substantially vertical axis so as to cause random spinning movement of said frame about said front wheel, said rear wheels being casters wherein the supporting axis thereof is inclined at an angle to the vertical in said first position and substantially vertical in said second position.

7. A toy wheeled vehicle adapted to be driven by a seated occupant and of the type having a large front driving wheel and a pair of spaced apart rear wheels of relatively small comparative diameter, said vehicle further having a frame and an occupant backrest pivotally supported upon said frame, said rear wheels in turn supported by said backrest, whereby pivotal movement of said backrest from a first normal upright position to a second rearward position changes the angle of the supporting axes of said rear wheels to cause said rear wheels to randomly spin about said front wheel and subsequently cause the vehicle to "spinout".

* * * * *